US009443114B1

United States Patent
Wong et al.

(10) Patent No.: US 9,443,114 B1
(45) Date of Patent: Sep. 13, 2016

(54) AUTO-LOGGING OF READ/WRITE COMMANDS IN A STORAGE NETWORK

(75) Inventors: William C. Wong, Cerritos, CA (US); Kha Nguyen, Anaheim, CA (US); Huy Tu Nguyen, Laguna Hills, CA (US); William W. Dennin, III, Mission Viejo, CA (US); Roger Baldwin, Mission Viejo, CA (US)

(73) Assignee: Marvell International Ltd., Hamilton (BM)

( * ) Notice: Subject to any disclaimer, the term of this patent is extended or adjusted under 35 U.S.C. 154(b) by 987 days.

(21) Appl. No.: 12/031,658

(22) Filed: Feb. 14, 2008

Related U.S. Application Data

(60) Provisional application No. 60/889,812, filed on Feb. 14, 2007.

(51) Int. Cl.
  *G06F 21/80* (2013.01)
  *G06F 11/34* (2006.01)

(52) U.S. Cl.
  CPC ......... *G06F 21/805* (2013.01); *G06F 11/3476* (2013.01)

(58) Field of Classification Search
  CPC ...... G06F 3/067; G06F 3/037; G06F 21/805; G06F 11/3476
  USPC ............................................................ 710/5
  See application file for complete search history.

(56) References Cited

U.S. PATENT DOCUMENTS

| | | | | |
|---|---|---|---|---|
| 5,239,637 A | * | 8/1993 | Davis | G06F 3/0601 711/165 |
| 6,545,978 B1 | * | 4/2003 | Sakurai | 370/236.2 |
| 7,266,726 B1 | * | 9/2007 | Ladd et al. | 714/27 |
| 2003/0026246 A1 | * | 2/2003 | Huang et al. | 370/352 |
| 2004/0054776 A1 | * | 3/2004 | Klotz et al. | 709/224 |
| 2006/0020818 A1 | * | 1/2006 | Mizuno | 713/182 |

OTHER PUBLICATIONS

Tanenbaum, Andrew. "Structured Computer Organization". 1984. Prentice-Hall Inc. 2nd Edition. pp. 10-12.*

* cited by examiner

*Primary Examiner* — Henry Tsai
*Assistant Examiner* — John Roche

(57) ABSTRACT

A system and method for verifying an identifier of a command. The method includes receiving an incoming command and sending a first alert to auto-logging hardware, wherein the auto-logging hardware sends a fetch instruction in response to receiving the first alert; retrieving an identifier of the incoming command in response to the fetch instruction and sending a second alert to the auto-logging hardware, wherein the auto-logging hardware sends a search instruction in response to receiving the second alert; and searching for the identifier of the incoming command in a table in response to the search instruction, the table storing identifiers previously assigned to other commands, wherein the incoming command is logged into the search table and marked as a searched command after the search for the first identifier in the table has completed successfully.

18 Claims, 8 Drawing Sheets

AUTO-LOGGING OF READ/WRITE COMMANDS IN A STORAGE NETWORK

CROSS-REFERENCE TO RELATED APPLICATION

This application claims the benefit of U.S. Provisional Patent Application No. 60/889,812, filed Feb. 14, 2007, the contents of which are hereby incorporated by reference as if fully stated herein.

TECHNICAL FIELD

The present invention relates generally to data processing, and more specifically to processing read and write commands from a host to an external memory.

BACKGROUND

Storing and retrieving data on a hard disk or other storage media are essential to modern computing. For example, a host (e.g., a host computer) typically stores large amounts of data in an external memory. As such, it is important for the host to be able to quickly and accurately read and write data to the external memory.

In one conventional read/write command system, each command includes an identifier (e.g., an originator exchange identifier (OXID)) that uniquely identifies the command. Commands being processed at the same time typically cannot share the same OXID, and the total number of OXIDs available within a system may be limited. Thus, before a new command can be processed, the system must verify that an OXID assigned to the new command is not currently in use by (or assigned to) another command.

In such a conventional read/write command system, system firmware typically verifies each command OXID sequentially using various methods. For example, the system firmware may be required to manually compare the incoming commands OXID to a list of OXID's of commands currently in the queue. This wait (lag) time may further be increased if the system firmware must arbitrate with other commands to access an OXID from external memory. Since each OXID currently assigned to commands must be verified sequentially, the lag time in verifying each OXID may lead to wasted cycles in which other commands are not being processed at all.

SUMMARY

In one aspect, the present invention addresses the foregoing by providing auto-logging of commands in a storage network.

Thus, in one aspect, a representative embodiment of the invention provides verification of whether an identifier of an incoming command has been previously assigned to another command. Auto-logging hardware is provided, and receive hardware receives the incoming command from the host and sends a first alert to the auto-logging hardware in response to the receive hardware receiving the incoming command. The auto-logging hardware sends a fetch instruction in response to receiving the first alert. Access logic retrieves the identifier of the incoming command from an external memory in response to receiving the fetch instruction, and sends a second alert to the auto-logging hardware once the identifier of the incoming command has been retrieved from external memory. The auto-logging hardware sends a search instruction in response to receiving the second alert. Search logic searches for the identifier of the incoming command in a table located in the external memory in response to the search instruction from the auto-logging hardware. The table stores identifiers previously assigned to other commands, and the incoming command is logged into the search table and marked as a searched command after the search for the identifier of the incoming command in the table has completed successfully.

By virtue of this arrangement, a command OXID is automatically checked by auto-logging hardware to determine if a duplicate command OXID exists, thus reducing the need for firmware to perform these functions. As such, firmware can process commands more quickly, since there is ordinarily not a need to spend the extra time to verify the OXID for each command while other commands remain idle.

In another aspect, a representative embodiment of the invention provides verification of whether an identifier of an incoming command has been previously assigned to another command. Means for auto-logging commands are provided, and receiving means receive the incoming command from the host and send a first alert to the auto-logging means in response to the receiving means receiving the incoming command. The auto-logging means send a fetch instruction in response receiving the first alert. Accessing means retrieve the identifier of the incoming command from an external memory in response to receiving the fetch instruction, and send a second alert to the auto-logging means once the identifier of the incoming command has been retrieved from external memory. The auto-logging means send a search instruction in response to receiving the second alert. Searching means search for the identifier of the incoming command in a table located in the external memory in response to the search instruction from the auto-logging means. The table stores identifiers previously assigned to other commands, and the incoming command is logged into the search table and marked as a searched command after the search for the identifier of the incoming command in the table has completed successfully.

In still another aspect, a representative embodiment of the invention provides a program for verifying whether an identifier of an incoming command has been previously assigned to another command. Auto-logging hardware is configured, and receive hardware is configured to receive the incoming command from the host and to send a first alert to the auto-logging hardware in response to the receive hardware receiving the incoming command. The auto-logging hardware sends a fetch instruction in response to receiving the first alert. Access logic is configured to retrieve the identifier of the incoming command from an external memory in response to receiving the fetch instruction, and to send a second alert to the auto-logging hardware once the identifier of the incoming command has been retrieved from external memory. The auto-logging hardware sends a search instruction in response to receiving the second alert. Search logic is configured to search for the identifier of the incoming command in a table located in the external memory in response to the search instruction from the auto-logging hardware. The table stores identifiers previously assigned to other commands, and the incoming command is logged into the search table and marked as a searched command after the search for the identifier of the incoming command in the table has completed successfully.

A more complete understanding of the invention can be obtained by reference to the following detailed description in connection with the attached drawings.

DETAILED DESCRIPTION

Figure 1:
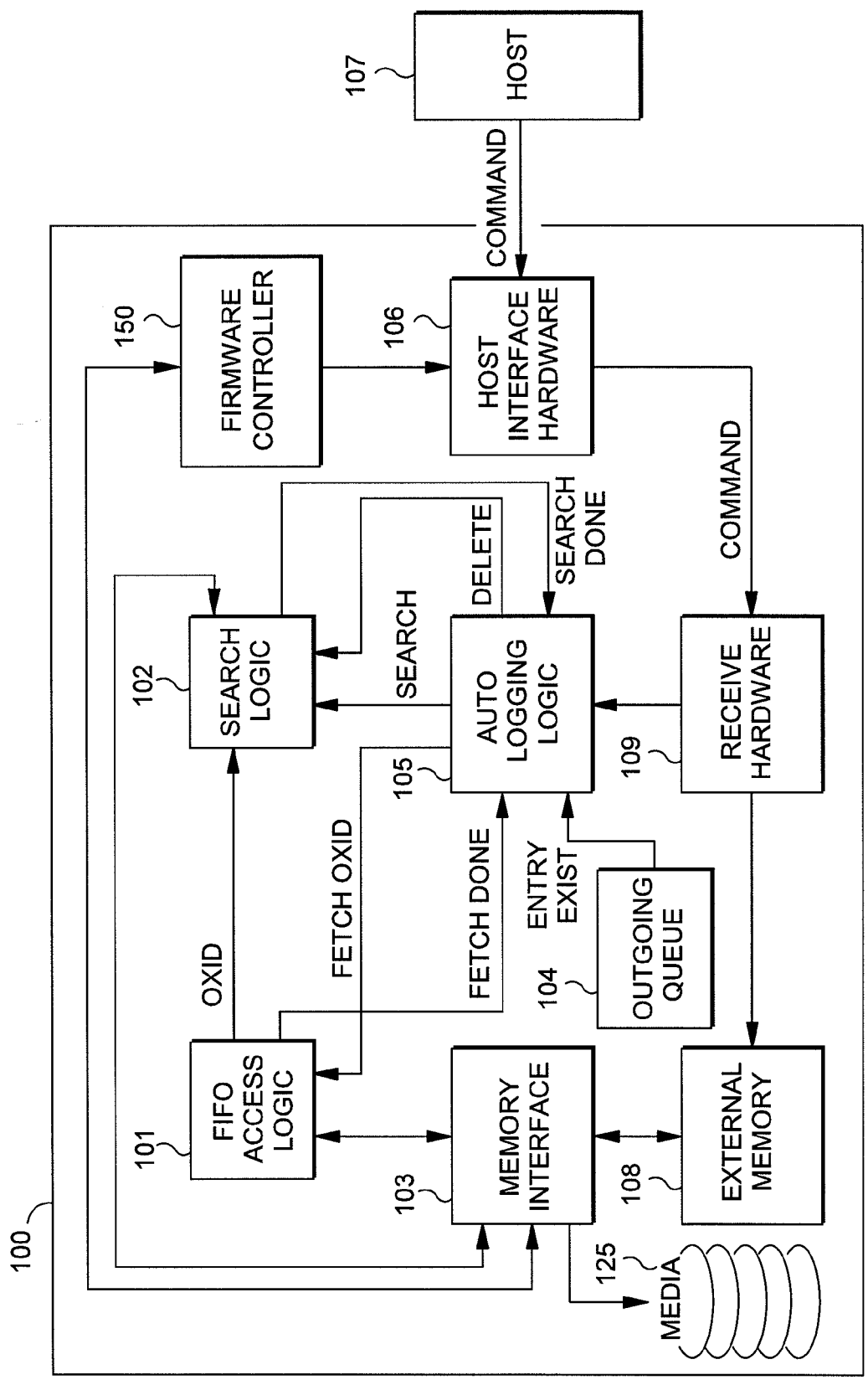
FIG. 1 is a block diagram of a command verification system in which an example of the present invention may be practiced.

FIG. 1 is a block diagram of a command verification system in which an embodiment of the present invention may be practiced.

In one implementation, the command verification system includes a hard disk drive 100 and a host 107. Hard disk drive 100 includes FIFO access logic 101, search logic 102, memory interface 103, outgoing queue 104, auto-logging logic 105, host interface hardware 106, external memory 108, receive hardware 109, storage media 125, and firmware controller 150.

FIFO access logic 101 is a hardware or software logic block that extracts (from external memory 108) a unique identifier (e.g., an OXID) that is assigned to an incoming (i.e., new) command.

In this regard, while an OXID is used as a representative example of a unique command identifier in this description, the present disclosure is applicable to any unique command identifier. For example, a Fibre Channel system uses an OXID, whereas a Serial Attached SCSI (SAS) system might use a TAG unique command identifier. Other types of unique command identifiers (or different terminology for a unique command identifier) are possible, and it should be understood that an OXID identifier is only one representative example.

In one implementation, FIFO access logic 101 is coupled to memory interface 103 for access to external memory 108. As shown in FIG. 1, (in one implementation) FIFO access logic 101 receives a FETCH OXID instruction from auto-logging logic 105. In response to the FETCH OXID instruction, FIFO access logic 101 retrieves an OXID from external memory 108, issues a FETCH DONE signal to auto-logging hardware 105, and sends the OXID to search logic 102.

Search logic 102 is a hardware or software logic block that searches for a duplicate OXID. In one embodiment, a table in external memory 108 indicates OXIDs that are currently in use (e.g., OXIDs that are currently assigned to commands in external memory 108), and search logic 102 verifies whether an OXID assigned to an incoming (i.e., new) command is currently assigned to another command by searching through the table. Thus, as shown in FIG. 1, search logic 102 is connected to memory interface 103, and receives an OXID that is assigned to the incoming command from FIFO access logic 101. Search logic 102 also receives a SEARCH instruction from auto-logging logic 105, and sends a SEARCH DONE signal to auto-logging logic 105. Search logic 102 may also receive a DELETE command from auto-logging logic 105 instructing a delete of an OXID from the table in external memory 108. Each of these processes will be described in greater detail below.

In one implementation, FIFO access logic 101 and search logic 102 are provided as separate logic blocks in order to streamline the throughput of commands. In particular, each access to external memory 108 may require a requesting device (e.g., FIFO access logic 101, search logic 102, or other component) to arbitrate for access to external memory 108. However, the time required to extract an OXID from external memory 108 may differ from the time required to search for the OXID in the table, and each might have a different priority in arbitration. Moreover, if these two functions were performed at the same time, the time for each access to external memory 108 might be unacceptably high. Thus, separating these functions allows for potentially faster overall access to external memory 108 in some applications.

Memory interface 103 is hardware for accessing external memory 108. For example, memory interface 103 is used by FIFO access logic 101 to extract an OXID of an incoming (i.e., new) command from external memory 108, while search logic 102 uses memory interface 103 to search the table of OXIDs in external memory 108.

Outgoing queue 104 stores the OXIDs of commands that have been processed and are to be deleted from the table in external memory 108. In one implementation, outgoing queue 104 sends an ENTRY EXIST signal to auto-logging logic 105, so that auto-logging logic 105 can instruct search logic 102 to delete the corresponding command stored in external memory 108 and delete the OXID from the table in external memory 108.

In one implementation, auto-logging logic 105 is a hardware block that manages signals from various elements of hard disk drive 100, and issues instructions to coordinate the verification of a command OXID. In one implementation, auto-logging logic 105 issues the FETCH OXID command, the SEARCH command, and the DELETE command, and receives a FETCH OXID signal, a SEARCH DONE signal, and an ENTRY EXIST signal. Auto-logging logic 105 is also connected to receive hardware 109 for receiving an indication of a new command from host 107. In one implementation, the new command comprises a read command for reading data stored on storage media 125, or comprises a write command for writing data to storage media 125.

By issuing the various instructions and waiting for the various signals required for verifying whether an incoming command's OXID extracted from external memory 108 overlaps a previously logged command, auto-logging logic 105 offloads these duties from system firmware. The system firmware can, therefore, process commands more rapidly without being required to make sure each command OXID is verified. In one implementation, upon receiving an alert of an incoming (new) command, auto-logging logic 105 instructs FIFO access logic 101 to extract an OXID of the new command from external memory 108. Auto-logging logic 105 receives the OXID from FIFO access logic 101, and instructs search logic 102 to search for the OXID in the table in external memory 108. That is, in one implementation, search logic 102 compares the OXID assigned to the new command with each OXID in the table—i.e., each OXID currently assigned to other commands—to determine whether the OXID assigned to the new command overlaps a previously logged command. Upon receiving an indication from search logic 102 that the OXID has been searched for, auto-logging logic 105 then logs the command into the search table, "marks" the command as searched, and decrements the backlog command counter. Thus, firmware is only interrupted in the case where an overlapped command has been detected. These processes will be described below in further detail with respect to FIG. 2.

In one implementation, auto-logging logic 105 includes a backlog counter (not shown) for tracking the number of (new) commands whose OXIDs have not yet been searched. For example, the command verification system may be configured to temporarily block further commands from the host if the number of backlogged commands reaches a predetermined maximum number. In one implementation, the backlog counter can be compared with a command counter in order to determine if a logged command is available to be processed. For example, both the backlog counter and the command counter would increment by 1 each time a new command is received, but only the backlog counter would be decremented once the command's OXID is successfully inserted into the memory. Thus, if the command counter is greater than the backlog counter, it could be determined that a command's identifier is "searched" and that the command is ready for processing. In one implementation, the backlog counter is incorporated within auto-logging hardware 105, however, the backlog counter could also be implemented as a separate unit.

Host interface hardware 106 is a hardware block that acts as an intermediary between host 107 and the rest of the command verification system. In particular, host interface hardware 106 receives a command from the host 107 and forwards the command to receive hardware 109, and receive hardware 109 alerts auto-logging logic 105 that a new command has been received.

Host 107 is a device that issues commands (e.g., read and write commands) to a device which then stores the received commands into external memory 108. In one implementation, host 107 is a computer, however, other devices could function as host 107. For example, host 107 could be a digital video recorder, digital audio player, personal digital assistant, digital camera, video game console, mobile phone, or any other device that can be configured to access an external memory (e.g., external memory 108).

External memory 108 stores commands and data from host 107. In one embodiment, external memory 108 is constructed as a memory that can process data relatively quickly. For example, external memory 108 could be constructed as a double-data-rate synchronous dynamic random access memory (DDR SDRAM, hereafter "DDR"). Other embodiments of an external memory are possible, including RAM, flash card, a CD/DVD drive, jump drive, floppy disk, flash memory, optical storage or optical jukebox storage, holographic storage, phase-change memory, and off-site network storage, among others. In addition, the physical embodiment of external memory 108 may differ according to the different embodiments of host 107 as described above.

Receive hardware 109 is a hardware block that receives commands and data from host 107 via host interface hardware 106, and writes the commands and data into external memory 108. Receive hardware 109 also alerts auto-logging logic 105 that a new command has arrived from host 107, thus prompting auto-logging logic 105 to verify an OXID assigned to the new command.

In one implementation, storage media 125 is a hard disk or other storage media that is configured for long-term storage of data. Storage media 125 is connected to memory interface 103 so that data can be read from and written to storage media 125. In one implementation, storage media 125 generally is constructed to store large amounts of data, but may have a slower access speed than external memory 108. While a hard disk is depicted in FIG. 1, the present invention may also be implemented with respect to storage media other than a hard disk. For example, the storage medium being accessed could be comprised of a CD/DVD drive, jump drive, floppy disk or magnetic tape, among others.

Firmware controller 150 is a hardware or software logic block responsible for operating the system firmware of the command verification system. In one implementation, the system firmware comprises a computer program responsible for programmable content of a hardware device. Thus, the operations performed by the system firmware and firmware controller 150 can vary widely depending on the application and environment, including (e.g.) system boot functions, graphics displays, control menus, I/O, and disk read/write, among many others. In addition, firmware may also handle error conditions such as failure to fetch an OXID by manually removing the command and decrementing the necessary counters.

Figure 2:
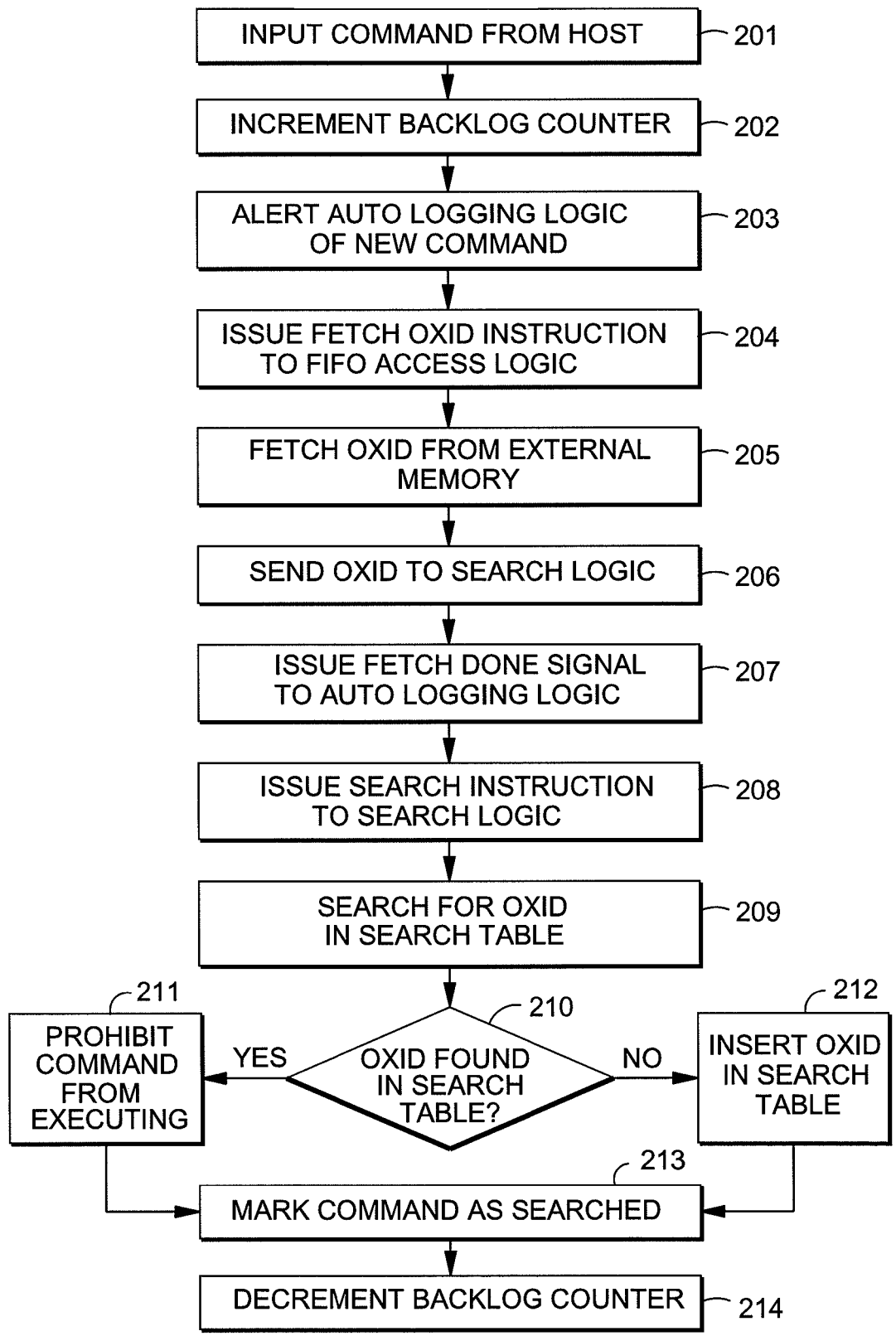
FIG. 2 is a flowchart illustrating an example process of verifying a command exchange ID.

One example of a process for verifying whether a unique identifier of an incoming command (e.g., an OXID) is currently assigned to another command will now be described with respect to FIG. 2.

The process begins in step 201 when an incoming (new) command is received from host 107 via receive hardware 109 and stored in external memory 108. In one implementation, commands and corresponding OXIDs are stored in a table within external memory 108.

In step 202, the backlog counter is incremented in response to receipt of the new command.

In step 203, receive hardware 109 automatically alerts auto-logging logic 105 that a new command has been received from host 107.

In step 204, auto-logging logic 105 responds to the alert of the new command by immediately issuing a FETCH OXID command to FIFO access logic 101 to fetch the OXID of the new command from external memory 108. In one implementation, since a command is stored in external memory 108 along with other data, the OXID of the new command must be extracted in order to compare the OXID (of the new command) against the OXIDs (assigned to other commands) in the table.

In step 205, FIFO access logic 101 retrieves the OXID of the new command from external memory 108 using memory interface 103. In one embodiment, commands are stored in external memory in a First-In-First-Out (FIFO) method, and thus FIFO access logic 101 can simply extract the OXID of the "top" command in external memory 108.

In step 206, FIFO access logic 101 sends the OXID (of the new command) to search logic 102. This transmission is shown as "OXID" in FIG. 1.

In step 207, FIFO access logic 101 issues an indication to auto-logging logic 105 that FIFO access logic 101 is done fetching the OXID (of the new command). This signal is shown in FIG. 1 as FETCH OXID.

In step 208, auto-logging logic 105 responds to the FETCH OXID signal by instructing search logic 102 to search the table in external memory 108 for the OXID received from FIFO access logic 101. This instruction is shown in FIG. 1 as SEARCH.

In step 209, search logic 102 searches for the OXID (of the new command) in external memory 108. In the embodiment described above, commands are stored in external memory 108 in a table indicating OXIDs currently in use (i.e., currently assigned to other commands), and search logic 102 traverses the search table to determine whether the OXID received from FIFO access logic 101 is present in the table. Other methods of storage and search of the command OXIDs are possible.

In step 210, a determination is made whether the OXID has been found in the table. If so, the process proceeds to step 211. If not, the process proceeds to step 212.

In step 211 (i.e., if the OXID (of the new command) has been found in the table), the new command is prohibited from being processed. In particular, a duplicate OXID in the table indicates that the OXID (of the new command) is in use by another command. Since an OXID can not be assigned to more than one command at a time, the new command must be prohibited from processing and the firmware notified. In one implementation, such prohibited commands are simply discarded. The process then proceeds to step 213.

Alternatively, in step 212, if the OXID (of the new command) is not found in the search table in step 210, the OXID is inserted (logged) into the search table, thus indicating that the OXID should not be assigned to other (e.g., subsequently received) commands. The process then proceeds to step 213.

In step 213, search logic 102 sends an indication to auto-logging logic 105 that the new command has been searched successfully, shown as SEARCH DONE in FIG. 1. This prompts auto-logging logic 105 to mark the new command as searched, for example by associating the searched command in a new table of searched commands. Then, the system firmware can simply process the searched commands without regard to verifying each OXID of the searched commands.

In step 214, the backlog counter is decremented, since one less command now requires search. As mentioned, the backlog counter can be compared with a command counter in order to determine if a logged command is available to be processed.

By virtue of this process, an OXID is automatically checked by auto-logging hardware to determine if a duplicate OXID exists, thus reducing the need for system firmware to perform these functions. Thus, to the extent that there is a need for firmware to manually log command tags which includes waiting for signals and interrupts, such waiting is performed by the auto-logging hardware 105, rather than the system firmware. As such, the system firmware can process (searched) commands more quickly, since there is no need to spend the extra time to verify the OXID for each command while other commands remain idle.

Figure 3:
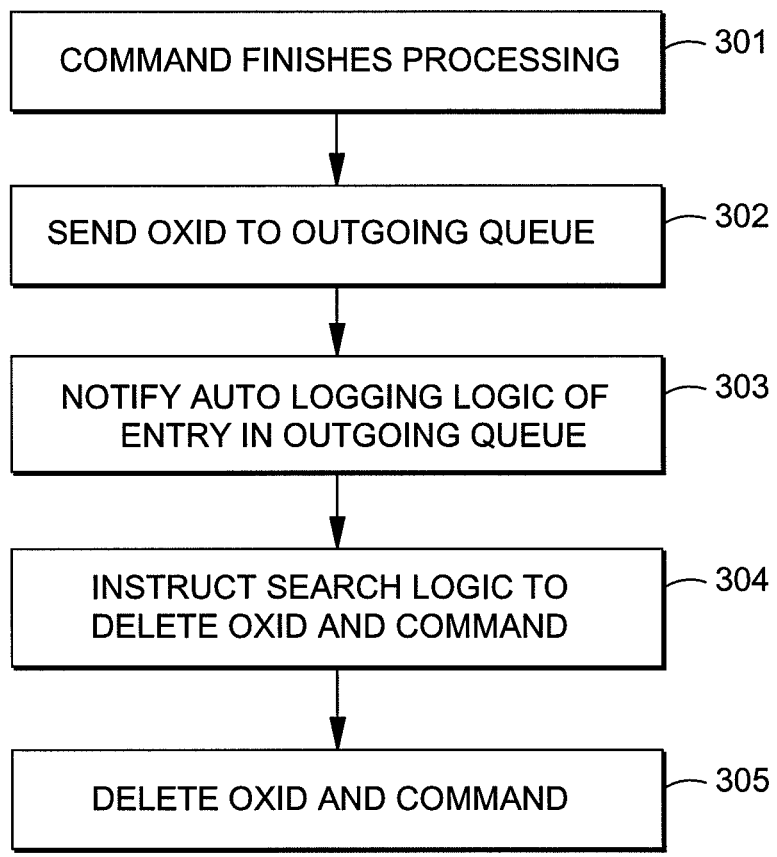
FIG. 3 is a flowchart illustrating an example process of deleting a command exchange ID.

In addition to locating and inserting OXIDs in the table, example embodiments of the present invention are also capable of deleting an OXID from the table when the corresponding command finishes processing, so that the deleted OXID can be re-assigned to another command (e.g., a new command). One example of the process of deleting a command and OXID will now be described with respect to FIG. 3.

In step 301, a command finishes processing. Thus, both the command and OXID can be deleted, allowing the OXID to be used by a new command.

In step 302, the OXID of the command is sent to outgoing queue 104, which (in one implementation) stores the OXIDs of commands to be deleted. In particular, hardware moves the command automatically to the outgoing queue for deletion.

In step 303, outgoing queue 104 notifies auto-logging logic 105 that a new OXID entry exists in the queue and provides the OXID to auto-logging logic 105. This signal is shown as ENTRY EXIST in FIG. 1. Auto-logging logic 105 can then provide this information to search logic 102.

In step 304, auto-logging logic 105 instructs search logic 102 to search for the OXID and corresponding command in external memory 108. This command is shown in FIG. 1 as DELETE. In one implementation, the search process occurs in the same manner as the process for inserting a new OXID, i.e., traversing the table.

In step 305, the OXID and corresponding command are deleted from external memory 108 by search logic 102 and/or system hardware. Thus, the OXID is available to be re-used with (or re-assigned to) a new command.

Thus, by virtue of the above, commands and corresponding OXIDs are deleted from external memory 108 with little or no intervention necessary on the part of system firmware.

Figure 4:
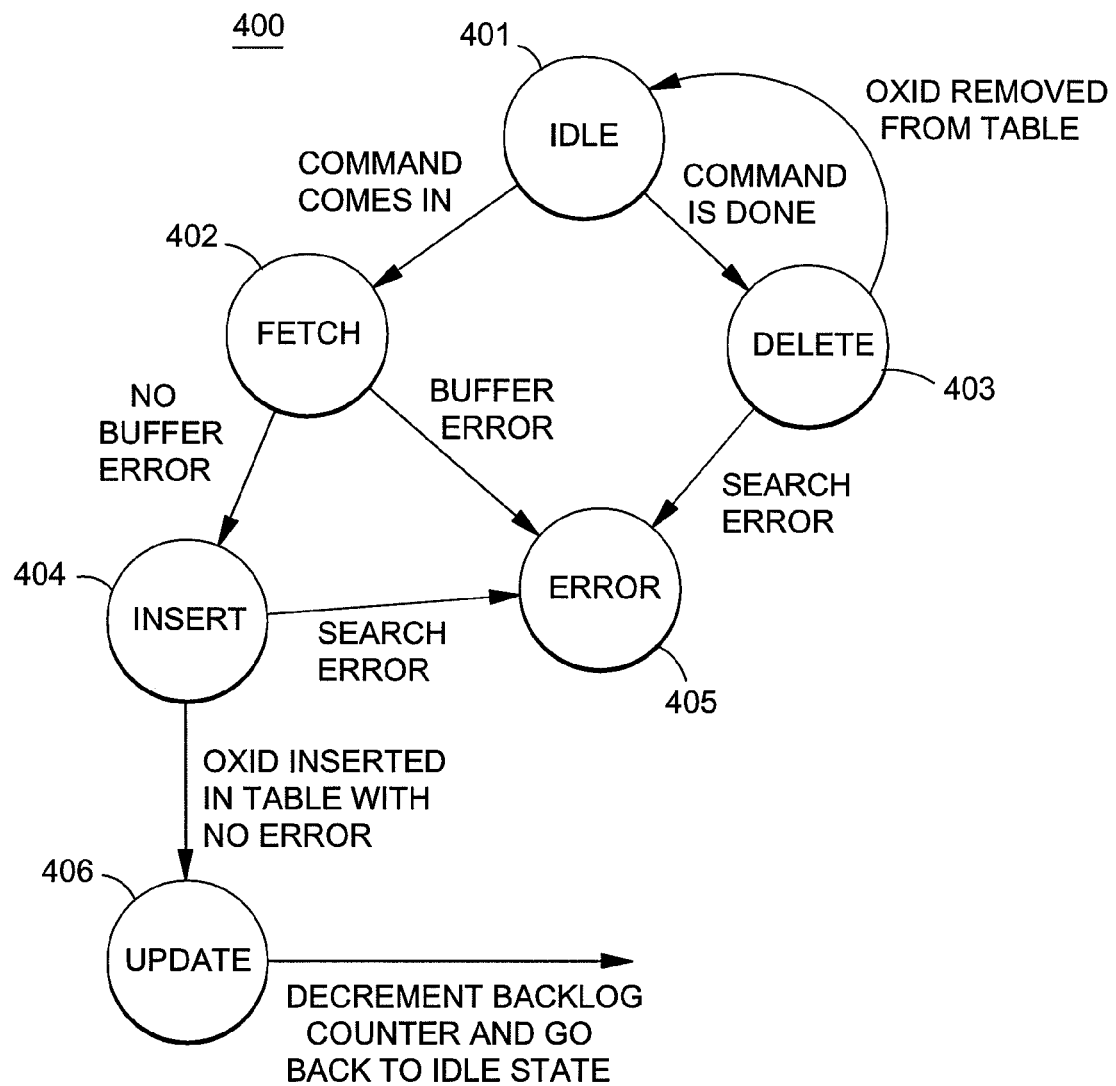
FIG. 4 illustrates a sample of a state machine that can be implemented in the auto-logging hardware of this example of the present invention.

The control implemented via auto-logging logic 105 can be configured in hardware in various methods, such as by implementing a state machine. FIG. 4 illustrates a diagram of a sample state machine that can be implemented in auto-logging hardware 105.

State 401 is the IDLE state, in which auto-logging logic 105 is not taking any action in regards to a command. However, if a command comes in (e.g., a new command is received from host 107), auto-logging logic 105 proceeds to FETCH state 402, in which the instruction FETCH OXID is issued to FIFO access logic 101 to retrieve the OXID assigned to the new command.

If a buffer error occurs during the fetch operation, auto-logging logic 105 proceeds to ERROR state 403. ERROR state 403 may be associated with error recovery processes, or may prompt error notifications to the user or another device.

If a buffer error does not occur and the OXID (of the new command) has been retrieved, auto-logging logic 105 proceeds to INSERT state 404, in which auto-logging logic 105 instructs search logic 102 to search for the OXID (of the new command) in the table, and to insert the OXID in the table if the OXID is not already contained in the table. If this operation fails, auto-logging logic 105 proceeds to ERROR state 403. If the OXID is inserted in the table with no error, auto-logging logic 105 proceeds to UPDATE state 406.

In UPDATE state 406, auto-logging logic 105 decrements the backlog counter, and returns to IDLE state 401.

Beginning again from IDLE state 401, if a command completes processing, auto-logging logic 105 proceeds from IDLE state 401 to DELETE state 403, in which auto-logging logic 105 instructs search logic 102 to delete the corresponding OXID and command from the table in external memory 108. If this operation is successful and the OXID is removed from the table, auto-logging logic 105 proceeds back to the IDLE state 401. If there is an error in locating the OXID, auto-logging logic 105 proceeds to ERROR state 405.

As mentioned above, other methods of implementing the hardware in auto-logging logic 105 are possible. For example, the hardware could implement an if-then structure or case structure.

Figure 5A:
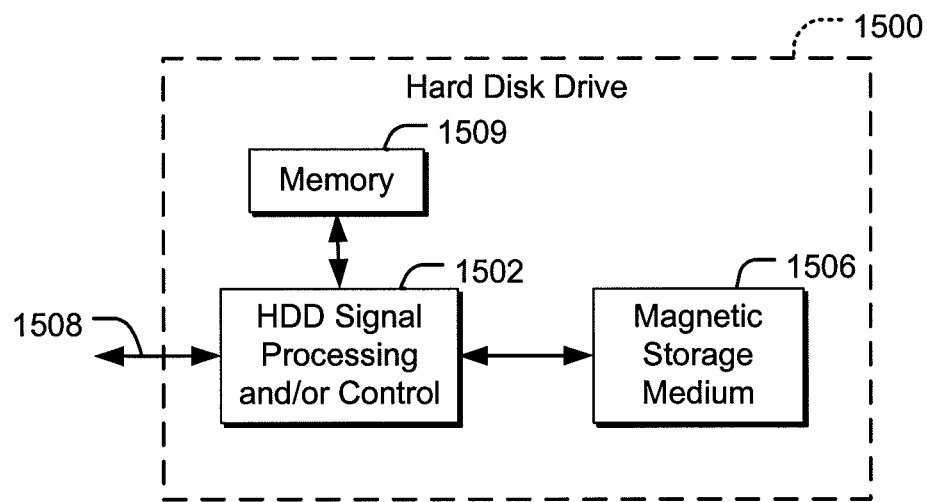
FIG. 5A is a block diagram showing an embodiment of the invention in a hard disk drive (HDD).

Referring now to FIGS. 5A-5H, various exemplary implementations of the present invention are shown. Referring to FIG. 5A, the present invention may be embodied for auto-logging commands in a hard disk drive (HDD)1500. The present invention may implement either or both signal processing and/or control circuits, which are generally identified in FIG. 5A at 1502. In some implementations, signal processing and/or control circuit 1502 and/or other circuits (not shown) in HDD 1500 may process data, perform coding and/or encryption, perform calculations, and/or format data that is output to and/or received from a magnetic storage medium 1506.

HDD 1500 may communicate with a host device (not shown) such as a computer, mobile computing devices such as personal digital assistants, cellular phones, media or MP3 players and the like, and/or other devices via one or more wired or wireless communication links 1508. HDD 1500 may be connected to memory 1509, such as random access memory (RAM), a low latency nonvolatile memory such as flash memory, read only memory (ROM) and/or other suitable electronic data storage.

Figure 5B:
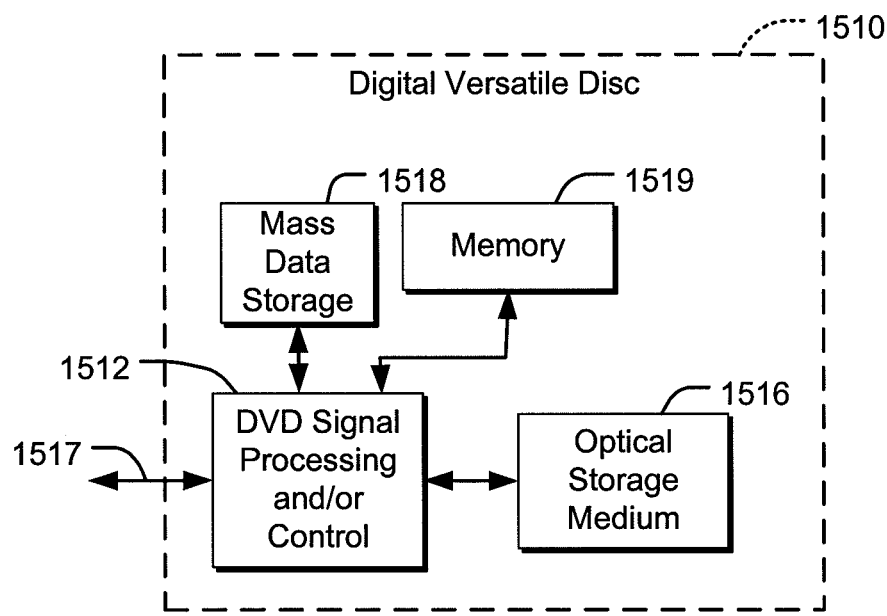
FIG. 5B is a block diagram of an embodiment of the invention in a digital versatile disc (DVD) drive.

Referring now to FIG. 5B, the present invention may be embodied for auto-logging commands in a digital versatile disc (DVD) drive 1510. The present invention may implement either or both signal processing and/or control circuits, which are generally identified in FIG. 5B at 1512, and/or mass data storage 1518 of DVD drive 1510. Signal processing and/or control circuit 1512 and/or other circuits (not shown) in DVD drive 1510 may process data, perform coding and/or encryption, perform calculations, and/or format data that is read from and/or data written to an optical storage medium 1516. In some implementations, signal processing and/or control circuit 1512 and/or other circuits (not shown) in DVD drive 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD drive 1510 may communicate with mass data storage 1518 that stores data in a nonvolatile manner. Mass data storage 1518 may include a hard disk drive (HDD) such as that shown in FIG. 5A. The HDD may be a mini HDD that includes one or more platters having a diameter that is smaller than approximately 1.8". DVD drive 1510 may be connected to memory 1519, such as RAM, ROM, low latency nonvolatile memory such as flash memory, and/or other suitable electronic data storage.

Figure 5C:
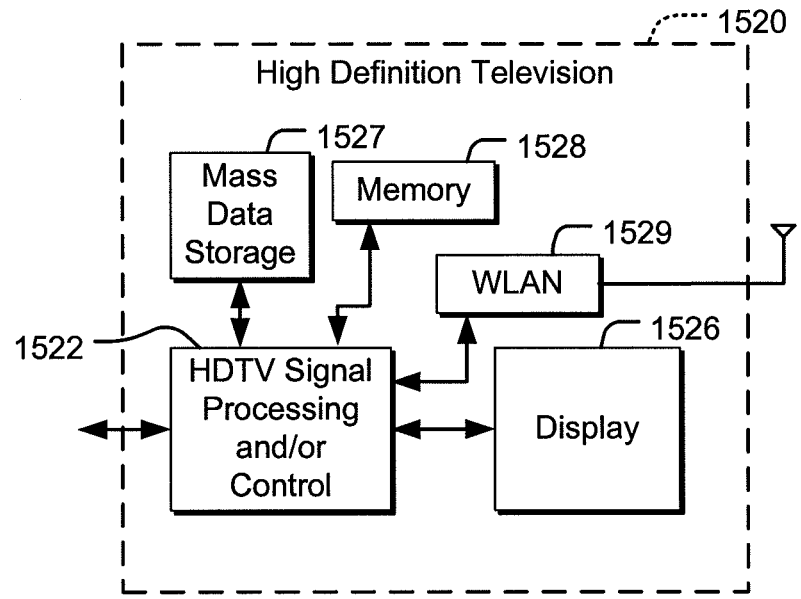
FIG. 5C is a block diagram of an embodiment of the invention in a high definition television (HDTV).

Referring now to FIG. 5C, the present invention may be embodied for auto-logging commands in a high definition television (HDTV) 1520. The present invention may implement either or both signal processing and/or control circuits, which are generally identified in FIG. 5C at 1522, a WLAN network interface 1529 and/or mass data storage 1527 of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/or perform any other type of HDTV processing that may be required.

HDTV 1520 may communicate with mass data storage 1527 that stores data in a nonvolatile manner such as optical and/or magnetic storage devices, for example, hard disk drives and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via WLAN network interface 1529.

Figure 5D:
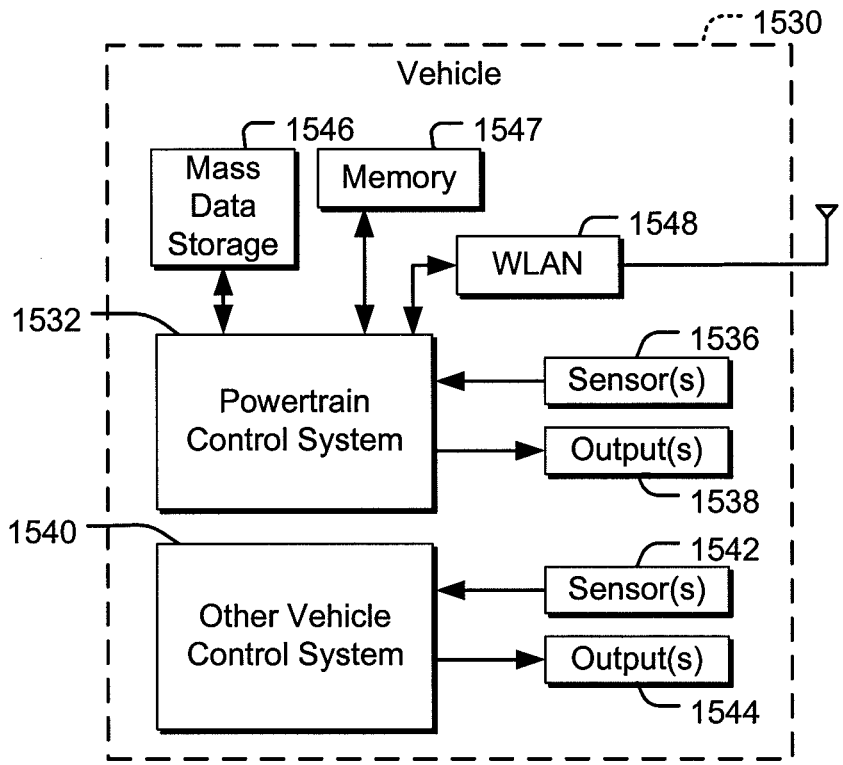
FIG. 5D is a block diagram of an embodiment of the invention in a vehicle.

Referring now to FIG. 5D, the present invention may be embodied for auto-logging commands in a control system of a vehicle 1530, a WLAN network interface 1548 and/or mass data storage 1546 of the vehicle 1530. In some implementations, the present invention implements a powertrain control system 1532 that receives inputs from one or more sensors 1536 such as temperature sensors, pressure sensors, rotational sensors, airflow sensors and/or any other suitable sensors and/or that generates one or more output control signals 1538 such as engine operating parameters, transmission operating parameters, braking parameters, and/or other control signals.

The present invention may also be embodied in an other control system 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices for example hard disk drives and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via WLAN network interface 1548. The control system 1540 may also include mass data storage, memory and/or a WLAN network interface (all not shown).

Figure 5E:
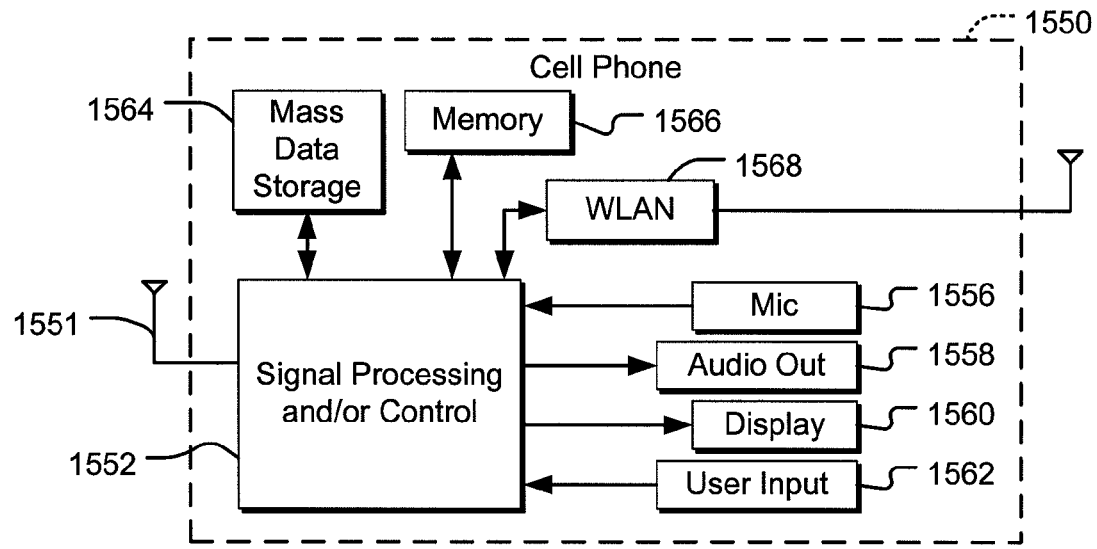
FIG. 5E is a block diagram of an embodiment of the invention in a cellular or mobile phone.

Referring now to FIG. 5E, the present invention may be embodied for auto-logging commands in a cellular phone 1550 that may include a cellular antenna 1551. The present invention may implement either or both signal processing and/or control circuits, which are generally identified in FIG. 5E at 1552, a WLAN network interface 1568 and/or mass data storage 1564 of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices for example hard disk drives HDD and/or DVD drives. At least one HDD may have the configuration shown in FIG. 5A and/or at least one DVD drive may have the configuration shown in FIG. 5B.

The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via WLAN network interface 1568.

Figure 5F:
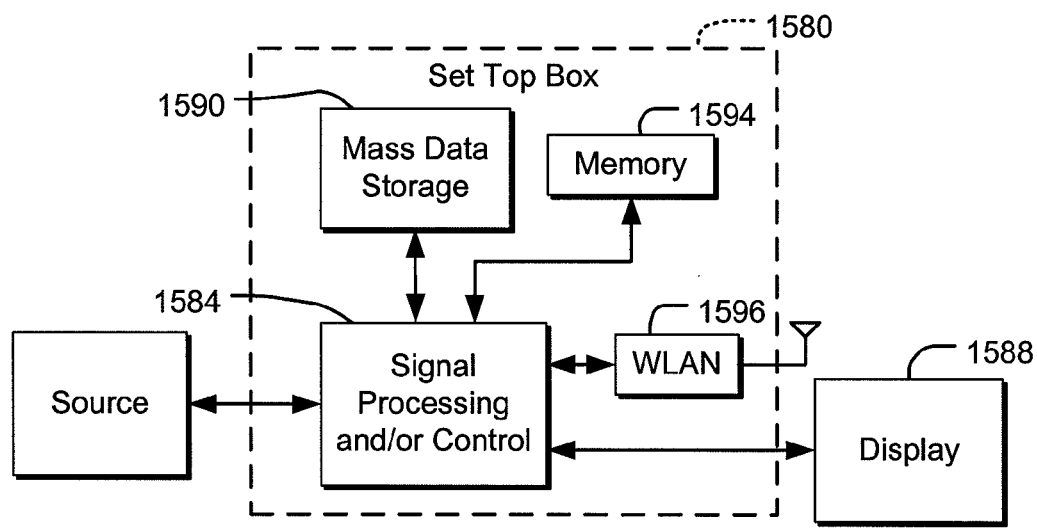
FIG. 5F is a block diagram of an embodiment of the invention in a set top box.

Referring now to FIG. 5F, the present invention may be embodied for auto-logging commands in a set top box 1580. The present invention may implement either or both signal processing and/or control circuits, which are generally identified in FIG. 5F at 1584, a WLAN network interface 1596 and/or mass data storage 1590 of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices for example hard disk drives and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via WLAN network interface 1596.

Figure 5G:
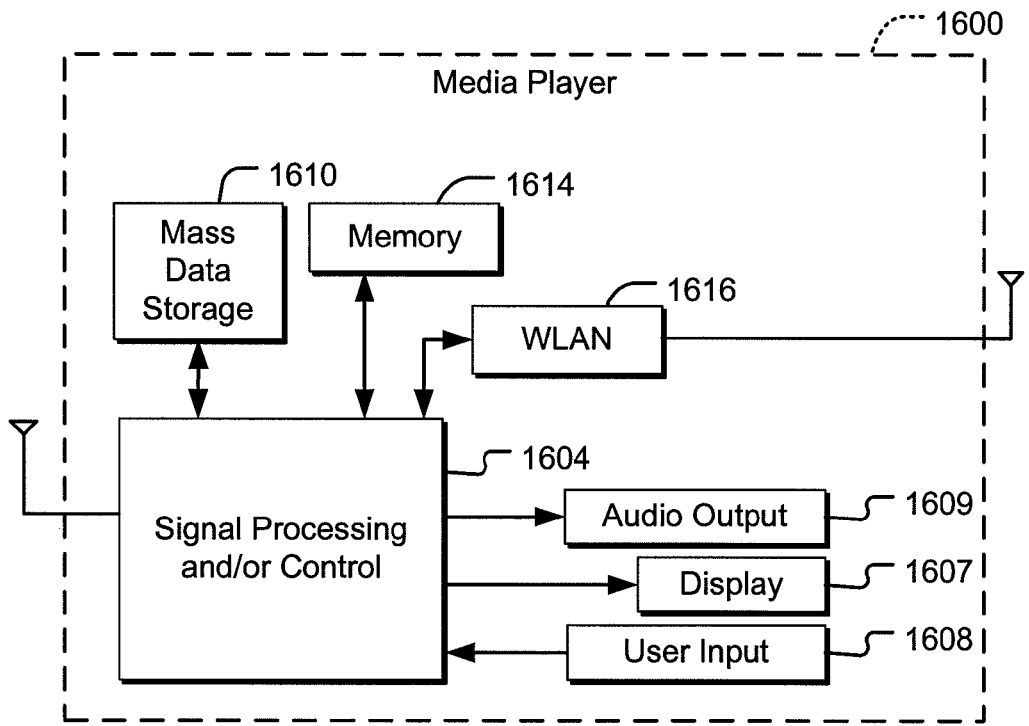
FIG. 5G is a block diagram of an embodiment of the invention in a media player.

Referring now to FIG. 5G, the present invention may be embodied for auto-logging commands in a media player 1600. The present invention may implement either or both signal processing and/or control circuits, which are generally identified in FIG. 5G at 1604, a WLAN network interface 1616 and/or mass data storage 1610 of the media player 1600. In some implementations, media player 1600 includes a display 1607 and/or a user input 1608 such as a keypad, touchpad and the like. In some implementations, media player 1600 may employ a graphical user interface (GUI) that typically employs menus, drop down menus, icons and/or a point-and-click interface via display 1607 and/or user input 1608. Media player 1600 further includes an audio output 1609 such as a speaker and/or audio output jack. Signal processing and/or control circuits 1604 and/or other circuits (not shown) of media player 1600 may process data, perform coding and/or encryption, perform calculations, format data and/or perform any other media player function.

Media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage 1623 may include optical and/or magnetic storage devices, for example, hard disk drives and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". Media player 1600 may be connected to memory 1614 such as RAM, ROM, low latency nonvolatile memory such as flash memory and/or other suitable electronic data storage. Media player 1600 also may support connections with a WLAN via WLAN network interface 1616. Still other implementations in addition to those described above are contemplated.

Figure 5H:
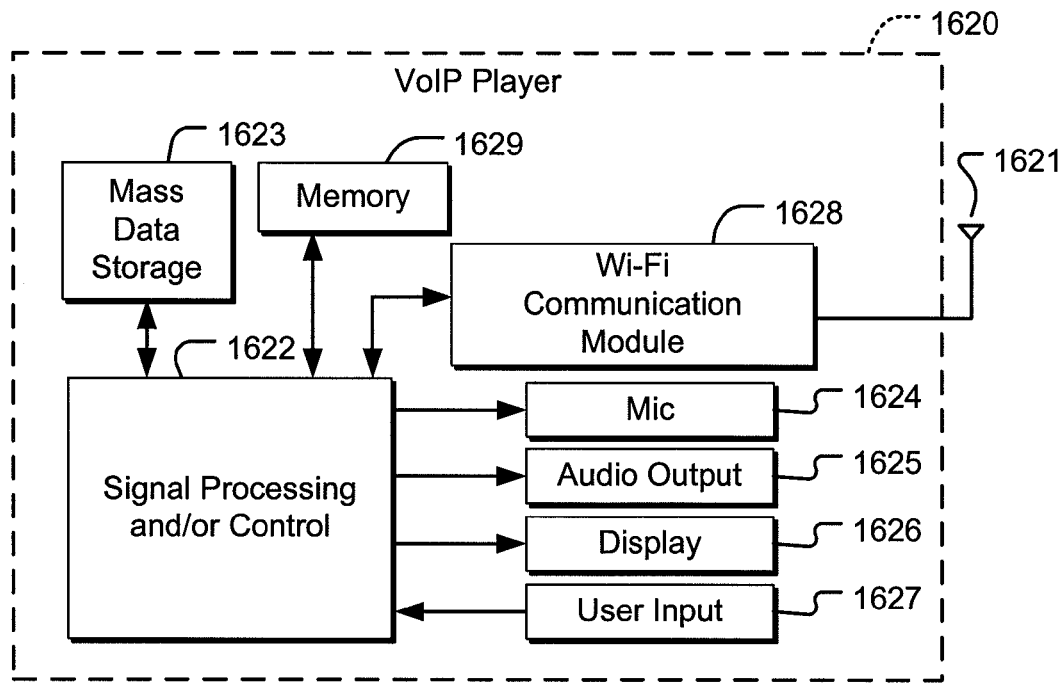
FIG. 5H is a block diagram of an embodiment of the invention in a Voice-over Internet Protocol (VoIP) player.

Referring to FIG. 5H, the present invention may be embodied for auto-logging commands in a Voice over Internet Protocol (VoIP) player 1620 that may include an antenna 1621. The present invention may implement either or both signal processing and/or control circuits, which are generally identified in FIG. 5H at 1622, a wireless interface and/or mass data storage 1623 of the VoIP player 1620. In some implementations, VoIP player 1620 includes, in part, a microphone 1624, an audio output 1625 such as a speaker and/or audio output jack, a display monitor 1626, an input device 1627 such as a keypad, pointing device, voice actuation and/or other input devices, and a Wireless Fidelity (Wi-Fi) communication module 1628. Signal processing and/or control circuits 1622 and/or other circuits (not shown) in VoIP player 1620 may process data, perform coding and/or encryption, perform calculations, format data and/or perform other VoIP player functions.

VoIP player 1620 may communicate with mass data storage 1623 that stores data in a nonvolatile manner such as optical and/or magnetic storage devices, for example hard disk drives and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". VoIP player 1620 may be connected to memory 1629, which may be a RAM, ROM, low latency nonvolatile memory such as flash memory and/or other suitable electronic data storage. VoIP player 1620 is configured to establish communications link with a VoIP network (not shown) via Wi-Fi communication module 1628.

The invention has been described above with respect to particular illustrative embodiments. It is understood that the invention is not limited to the above-described embodiments and that various changes and modifications may be made without departing from the spirit and scope of the invention. For example, although the implementations and methods discussed above are primarily described in connection with OXIDs, the implementations and methods are generally applicable to other types of identifiers. In addition, steps of the methods discussed above may be performed in a different order and still achieve desirable results.

What is claimed is:

1. An apparatus comprising:
   auto-logging hardware;
   receive hardware configured to:
   receive a first incoming command and a second incoming command,
   send a first alert to the auto-logging hardware in response to receiving the first incoming command, and
   send a second alert to the auto-logging hardware in response to receiving the second incoming command,
   wherein the auto-logging hardware is configured to send (i) a first fetch instruction in response to receiving the first alert and (ii) a second fetch instruction in response to receiving the second alert;
   access logic configured to retrieve, from an external memory, (i) a first identifier of the first incoming command in response to receiving the first fetch instruction and (ii) a second identifier of the second incoming command in response to receiving the second fetch instruction,
  wherein each of the first incoming command and the second incoming command is received from a same host,
  wherein in response to the first incoming command and the second incoming command being two different commands, the first identifier is different from the second identifier,
  wherein the access logic is further configured to send (i) a third alert to the auto-logging hardware once the first identifier of the first incoming command has been retrieved from the external memory and (ii) a fourth alert to the auto-logging hardware once the second identifier of the second incoming command has been retrieved from the external memory, and
  wherein the auto-logging hardware is further configured to send (i) a first search instruction in response to receiving the third alert and (ii) a second search instruction in response to receiving the fourth alert; and
search logic configured to, in response to the first search instruction and the second search instruction, search for the first identifier and the second identifier in a table located in the external memory, the table storing identifiers assigned to other commands that are currently being processed,
wherein the search logic is further configured to:
  in response to the search logic finding the first identifier in the table, determine that the first identifier is currently assigned to another command other than the first incoming command, and
  in response to the search logic determining that the first identifier is currently assigned to the another command other than the first incoming command, prohibit the first incoming command from being processed by system firmware, and
wherein the search logic is further configured to:
  in response to the search logic not finding the second identifier in the table, determine that the second identifier is currently not assigned to any command, and
  in response to the search logic determining that the second identifier is currently not been assigned to any command, facilitate:
    insertion of the second identifier, which is retrieved by the access logic from the external memory in response to receiving the second incoming command, into the table, and
    processing of the second incoming command by the system firmware.

2. The apparatus according to claim 1, wherein the second identifier of the second incoming command is deleted from the table once the second incoming command is finished being processed by system firmware.

3. The apparatus according to claim 1, further comprising a backlog counter, wherein the backlog counter is incremented for each command received from the host that has a corresponding identifier which has not yet been searched by the search logic, and wherein the backlog counter is decremented each time the search logic has completed searching for a given identifier in the table.

4. The apparatus according to claim 1, wherein once a searched command is finished being processed by the system firmware and completes without error, an identifier associated with the searched command is automatically transferred to an outgoing queue for deletion, and wherein the identifier is re-usable with another command once the identifier has been deleted from the outgoing queue.

5. The apparatus according to claim 1, wherein system firmware processes one or more searched commands while the auto-logging hardware manages verification of each identifier associated with commands from the host.

6. The apparatus according to claim 5, wherein the system firmware communicates with the host and the external memory to process application requests of the host while the auto-logging hardware manages verification of each identifier associated with commands received from the host.

7. The apparatus according to claim 1, wherein the apparatus is coupled to a hard disk.

8. The apparatus according to claim 7, wherein the host comprises one or more of a computer, a digital video recorder, a digital audio player, a personal digital assistant, a digital camera, a video game console, or a mobile phone.

9. The apparatus according to claim 1, further comprising:
  the system firmware to process the second incoming command without having to verify whether the second identifier of the second incoming command has been assigned to another command.

10. A method comprising:
receiving, by receive hardware, a first incoming command and a second incoming command;
sending, by the receive hardware, a first alert to auto-logging hardware in response to receiving the first incoming command, and a second alert to the auto-logging hardware in response to receiving the second incoming command;
sending, by the auto-logging hardware, a first fetch instruction to access logic in response to receiving the first alert, and a second fetch instruction to access logic in response to receiving the second alert;
retrieving, by the access logic from an external memory, a first identifier of the first incoming command in response to the first fetch instruction, and a second identifier of the second incoming command in response to the second fetch instruction,
  wherein each of the first incoming command and the second incoming command is received from a same host, and wherein in response to the first incoming command and the second incoming command being two different commands, the first identifier is different from the second identifier;
sending a third alert to the auto-logging hardware once the first identifier of the first incoming command has been retrieved from the external memory, and a fourth alert to the auto-logging hardware once the second identifier of the second incoming command has been retrieved from the external memory;
sending, by the auto-logging hardware, (i) a first search instruction to search logic in response to receiving the third alert and (ii) a second search instruction to the search logic in response to receiving the fourth alert;
searching, by the search logic for the first identifier and the second identifier in a table located in the external memory in response to the first search instruction and the second search instruction, the table storing identifiers assigned to other commands that are currently being processed;
in response to the search logic finding the first identifier in the table, determining that the first identifier is currently assigned to another command other than the first incoming command;

in response to determining that the first identifier is currently been assigned to another command other than the first incoming command, prohibiting the first incoming command from being processed by system firmware;

in response to the search logic not finding the second identifier in the table, determining that the second identifier is currently not assigned to any command; and in response to determining that the second identifier is currently not assigned to any command, (i) inserting the second identifier, which is retrieved by the access logic from the external memory in response to receiving the second incoming command, into the table and (ii) processing the second incoming command by the system firmware.

11. The method according to claim 10, further comprising:
deleting the second identifier of the second incoming command in response to the completion of processing of the second incoming command by system firmware.

12. The method according to claim 10, further comprising:
incrementing a backlog counter for each command received from the host that has a corresponding identifier which has not yet been verified; and
decrementing the backlog counter each time a search for a given identifier in the table has completed and the given identifier has been logged.

13. The method according to claim 10, wherein each identifier comprises an originator exchange identifier (OXID) or TAG identifier.

14. The method according to claim 10, wherein system firmware processes one or more searched commands while the auto-logging hardware manages verification of each identifier associated with commands received from the host.

15. The method according to claim 14, wherein the system firmware communicates with the host and the external memory to process application requests of the host while the auto logging hardware manages verification of each identifier associated with commands received from the host.

16. The method according to claim 10, further comprising providing a hard disk, wherein the hard disk is constructed to store a larger amount of data than the external memory.

17. The method according to claim 16, wherein the host comprises one or more of a computer, a digital video recorder, a digital audio player, a personal digital assistant, a digital camera, a video game console, or a mobile phone.

18. The method according to claim 10, further comprising providing the system firmware, wherein the system firmware processes the second incoming command without having to verify whether the second identifier of the second incoming command has been assigned to the one or more other commands.

* * * * *